(12) United States Patent
Rao

(10) Patent No.: US 11,405,289 B2
(45) Date of Patent: Aug. 2, 2022

(54) DISTRIBUTED PACKET DEDUPLICATION

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 196 days.

(21) Appl. No.: 16/001,721

(22) Filed: Jun. 6, 2018

(65) Prior Publication Data
US 2019/0379588 A1 Dec. 12, 2019

(51) Int. Cl.
*H04L 43/028* (2022.01)
*H04L 67/1023* (2022.01)
*H04L 67/1034* (2022.01)

(52) U.S. Cl.
CPC ........ *H04L 43/028* (2013.01); *H04L 67/1023* (2013.01); *H04L 67/1034* (2013.01)

(58) Field of Classification Search
CPC ............... H04L 43/028; H04L 67/1034; H04L 67/1023; H04L 67/1014
See application file for complete search history.

(56) References Cited

U.S. PATENT DOCUMENTS

| | | | | |
|---|---|---|---|---|
| 8,307,359 | B1 * | 11/2012 | Brown | H04L 69/321 718/1 |
| 9,131,010 | B2 * | 9/2015 | Agrawal | H04L 69/24 |
| 9,210,090 | B1 * | 12/2015 | Baldi | H04L 47/31 |
| 10,152,386 | B1 * | 12/2018 | Ramachandran | G06F 11/1451 |
| 11,144,533 | B1 * | 10/2021 | Dalamatov | G06F 3/0641 |
| 2002/0161929 | A1 * | 10/2002 | Longerbeam | H04L 45/00 709/250 |
| 2003/0195919 | A1 * | 10/2003 | Watanuki | H04L 67/327 718/105 |
| 2010/0198797 | A1 * | 8/2010 | Wideman | G06F 16/1748 707/692 |
| 2011/0206055 | A1 * | 8/2011 | Leong | H04L 49/00 370/401 |
| 2012/0213069 | A1 * | 8/2012 | Oguchi | H04W 80/06 370/231 |
| 2012/0257631 | A1 * | 10/2012 | Nguyen | H04L 45/18 370/400 |

(Continued)

FOREIGN PATENT DOCUMENTS

EP 3206345 A2 8/2017

OTHER PUBLICATIONS

European Search Report dated Aug. 12, 2019 for EP Patent Application No. 19178686.2 filed Jun. 6, 2019, 9 pages., dated Aug. 12, 2019.

*Primary Examiner* — Ninos Donabed
(74) *Attorney, Agent, or Firm* — Perkins Coie LLP

(57) ABSTRACT

Introduced here are network visibility appliances capable of implementing a distributed deduplication scheme by routing traffic amongst multiple instances of a deduplication program. Data traffic can be forwarded to a pool of multiple network visibility appliances that collectively ensure no duplicate copies of data packets exist in the data traffic. The network visibility appliances can route the traffic to different instances of the deduplication program so that duplicate copies of a data packet are guaranteed to arrive at the same instance of the deduplication program, regardless of which network visibility appliance(s) initially received the duplicate copies of the data packet.

18 Claims, 14 Drawing Sheets

(56) References Cited

U.S. PATENT DOCUMENTS

| | | | |
|---|---|---|---|
| 2013/0218848 A1* | 8/2013 | Gunda | H04L 67/2842 707/E17.01 |
| 2014/0025770 A1* | 1/2014 | Warfield | G06F 16/134 709/213 |
| 2014/0372708 A1* | 12/2014 | Callaway | G06F 12/0871 711/135 |
| 2015/0012710 A1* | 1/2015 | Liang | H04L 67/2842 711/130 |
| 2015/0106939 A1* | 4/2015 | Lietz | H04L 63/1433 726/25 |
| 2016/0019232 A1* | 1/2016 | Lambright | G06F 16/1752 707/692 |
| 2016/0092254 A1* | 3/2016 | Borra | G06Q 20/14 718/1 |
| 2016/0149820 A1* | 5/2016 | McGhee | H04L 47/32 370/230 |
| 2016/0191384 A1* | 6/2016 | Shelar | H04L 45/38 370/392 |
| 2016/0285706 A1* | 9/2016 | Rao | H04L 43/028 |
| 2017/0126563 A1* | 5/2017 | Nanda | H04L 49/25 |
| 2017/0131934 A1* | 5/2017 | Kaczmarczyk | G06F 3/061 |
| 2018/0046667 A1* | 2/2018 | Wood | H04L 29/00 |
| 2018/0241699 A1* | 8/2018 | Raney | H04L 43/12 |
| 2018/0268253 A1* | 9/2018 | Hoffman | G06V 30/414 |
| 2018/0349362 A1* | 12/2018 | Sharp | G06F 16/14 |
| 2019/0215385 A1* | 7/2019 | Ethier | H04L 45/123 |

* cited by examiner

900

```
┌─────────────────────────────────────────────────────────────────────────┐
│     Receive data packets at an ingress port of a network visibility appliance │
│                                     901                                  │
└─────────────────────────────────────────────────────────────────────────┘
                                      │
┌─────────────────────────────────────────────────────────────────────────┐
│      Apply a transformation function to generate a value for each data packet │
│                                     902                                  │
└─────────────────────────────────────────────────────────────────────────┘
                                      │
┌─────────────────────────────────────────────────────────────────────────┐
│   Access a data structure that maps the values amongst multiple instances of a │
│       deduplication program or multiple network visibility appliances    │
│                                     903                                  │
└─────────────────────────────────────────────────────────────────────────┘
                                      │
┌─────────────────────────────────────────────────────────────────────────┐
│                   Separate the data packet into multiple batches          │
│                                     904                                  │
└─────────────────────────────────────────────────────────────────────────┘
                                      │
┌─────────────────────────────────────────────────────────────────────────┐
│   Forward at least one batch to a local instance of the deduplication program for │
│                                  examination                              │
│                                     905                                  │
└─────────────────────────────────────────────────────────────────────────┘
                                      │
┌─────────────────────────────────────────────────────────────────────────┐
│   Forward at least one other batch to an egress port for transmission to a second │
│                          network visibility appliance                     │
│                                     906                                  │
└─────────────────────────────────────────────────────────────────────────┘
                                      │
┌─────────────────────────────────────────────────────────────────────────┐
│    Receive an indication that the second network visibility appliance is not presently │
│                                   accessible                              │
│                                     907                                  │
└─────────────────────────────────────────────────────────────────────────┘
                                      │
┌─────────────────────────────────────────────────────────────────────────┐
│   Modify entries in the data structure that correspond to the at least one other │
│             batch to indicate a third network visibility appliance        │
│                                     908                                  │
└─────────────────────────────────────────────────────────────────────────┘
```

Identify multiple network visibility appliances to be included in a distributed deduplication scheme
1001

Instantiate a separate load balancer on each network visibility appliance
1002

Instantiate a separate instance of a deduplication program on each network visibility appliance
1003

Establish a communication channel between each network visibility appliance
1004

Program the separate load balancers to apply an identical transformation function to incoming data packets
1005

FIGURE 10

DISTRIBUTED PACKET DEDUPLICATION

TECHNICAL FIELD

At least one embodiment of the present disclosure pertains to techniques for eliminating duplicate copies of data packets included in network traffic received by multiple network visibility appliances.

BACKGROUND

Data traffic (or simply "traffic") in a computer network can be analyzed to improve real-time decision making for network operations, security techniques, etc. Traffic may be acquired at numerous points by a variety of devices/applications (collectively referred to as "nodes" in the computer network), and then forwarded to a network visibility appliance able to provide extensive visibility of traffic flow. Given the complexity and volume of traffic routed through many infrastructures, various kinds of network tools are often used to identify, analyze, or handle issues plaguing the computer network. These issues can include security threats, bottlenecks, etc. Examples of such network tools include an intrusion detection system (IDS) and an intrusion prevention system (IPS).

Network visibility appliances and network tools can operate as in-band devices (also referred to as "inline devices") or out-of-band devices. Out-of-band devices operate outside of the path of traffic between an origination node and a destination node, and thus receive copies of the data packets that make up the traffic rather than the original data packets. Out-of-band devices can freely modify the copies of the data packets because the original data packets are allowed to traverse the computer network unimpeded. Inline devices, on the other hand, operate within the path of traffic between an origination node and a destination node, and thus receive the original data packets.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

FIG. 9 depicts a process for achieving distributed deduplication by intelligently routing traffic amongst multiple instances of a deduplication program.

FIG. 10 depicts a process for implementing a distributed deduplication scheme.

DETAILED DESCRIPTION

Figure 1A:
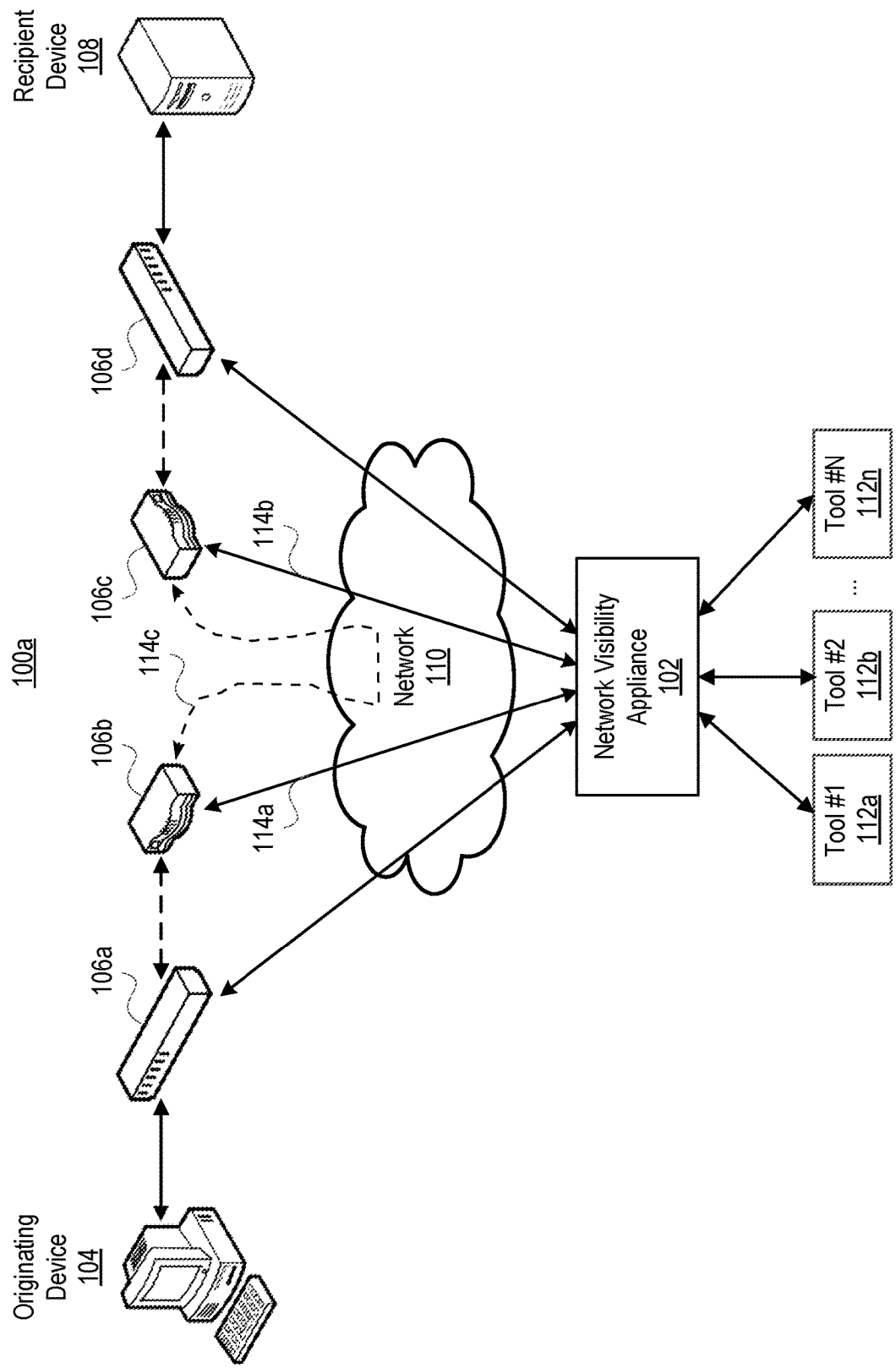
FIG. 1A depicts an example of a network arrangement in which a network visibility appliance receives data packets from multiple devices/applications (collectively referred to as "nodes") in a computer network.

A network visibility appliance can be configured to receive data packets from one or more nodes in a computer network. The network visibility appliance may be connected to one or more network tools configured to analyze the data packets (or copies of the data packets), monitor the traffic within the computer network, or block the transmission of abnormal (e.g., malicious) data packets.

Network visibility appliances have traditionally managed the bandwidth of data transfers by eliminating duplicate copies of data packets in the traffic observed within a temporal window. This task is typically performed by a computer program designed to perform a specialized data compression technique called deduplication.

Deduplication programs serve several purposes. For example, a deduplication program can be configured to reduce the number of data packets that are sent to a network tool by a network visibility appliance. As another example, a deduplication program can be configured to filter traffic to improve storage utilization. In a deduplication process, the deduplication program initially identifies incoming data packets and then stores the data packets (e.g., in cache memory). As the deduplication process continues, other incoming data packets are compared to the stored data packets and, whenever a match occurs, the redundant data packet is filtered from the traffic. Such action ensures that recipients of the traffic (e.g., network tools) are not inundated with duplicate copies of data packets. In some instances, the redundant data packet is replaced with a small reference that identifies the matching stored data packet.

Deduplication programs suffer from several drawbacks. With exponential growth in workloads within physical data centers, many end users have begun moving work processes and data to cloud computing platforms. To monitor the traffic associated with a single end user, however, a network visibility application may need to receive traffic from hundreds or thousands of virtual machines. Yet a single instance of a deduplication program often cannot handle the volume of traffic under consideration. Consequently, multiple instances of the deduplication program, each running in a separate network visibility appliance, are needed.

Introduced here, therefore, are network visibility appliances capable of implementing a distributed deduplication scheme by routing traffic amongst multiple instances of a deduplication program. Rather than forward all traffic associated with an end user to a single network visibility appliance for examination, the traffic can instead be forwarded to a pool of multiple network visibility appliances that collectively ensure no duplicate copies of data packets exist in the traffic. More specifically, these network visibility appliances can route the traffic to different instances of the deduplication program in such a manner that duplicate copies of a data packet are guaranteed to arrive at the same instance of the deduplication program, regardless of which network visibility appliance(s) initially received the duplicate copies of the data packet.

Terminology

References in this description "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The sequences of steps performed in any of the processes described here are examples. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Network Appliance Architecture

FIG. 1A depicts an example of a network arrangement 100a in which a network visibility appliance 102 receives data packets from multiple devices/applications (collectively referred to as "nodes") in a computer network 110. The nodes couple an originating device 104 (e.g., a desktop computer system) to a recipient device 108 (e.g., a server). Thus, the nodes allow data packets to be transmitted between the originating device 104 and the recipient device 108. Examples of nodes include switches (e.g., switches 106a, 106d), routers (e.g., routers 106b, 106c), network taps, etc.

Each node represents an entry point into the computer network 110. The entry points could be, and often are, from different points within the computer network 110. Generally, at least some of the nodes are operable to transmit data packets received as traffic (or duplicate copies of the data packets) to a network visibility appliance 102 for analysis. Traffic can be directed to the network visibility appliance 102 by a node that provides an entry point into the computer network 110.

Whether a node transmits the original data packets or copies of the original data packets to a device downstream of the node (e.g., the network visibility appliance 102) depends on whether the downstream device is an inline device or an out-of-band device. As noted above, inline devices receive the original data packets, while out-of-band devices receive copies of the original data packets.

Here, the network visibility appliance 102 can receive data packets from node 106b (e.g., via transmission path 114a) and pass at least some of the data packets to node 106c (e.g., via transmission path 114b). Because node 106b is able to transmit network traffic downstream through the network visibility appliance 102, node 106b need not be coupled directly to node 106c (i.e., transmission path 114c may not exist). Some or all of the nodes within the computer network 110 can be configured in a similar fashion.

When the network visibility appliance 102 is deployed as an inline device, data packets are received by the network visibility appliance 102 at a network port (also referred to as an "ingress port"). For example, data packets transmitted by node 106b via transmission path 114a are received by the network visibility appliance 102 at a particular ingress port. The network visibility appliance 102 may include multiple ingress ports that are coupled to different nodes in the computer network 110. The network visibility appliance 102 can be, for example, a monitoring platform that includes a chassis and interchangeable blades offering various functionalities, such as enhanced packet distribution and masking/filtering capabilities.

The network visibility appliance 102 can also transmit data packets from a network port (also referred to as an "egress port"). For example, the network visibility appliance 102 may include multiple egress ports that are coupled to different network tools 112a-n. Each network tool 112a-n can be deployed as an inline device or an out-of-band device at any given point in time. When a network tool is deployed as an out-of-band device, the network visibility appliance 102 creates a duplicate copy of at least some of the data packets received by the network visibility appliance 102, and then passes the duplicate copies to an egress port for transmission downstream to the out-of-band network tool. When a network tool is deployed as an inline device, the network visibility appliance 102 passes at least some of the original data packets to an egress port for transmission downstream to the inline network tool, and those data packets are then normally received back from the tool at a separate network port of the network visibility appliance 102 (i.e., assuming the data packets are not blocked by the tool).

Figure 1B:
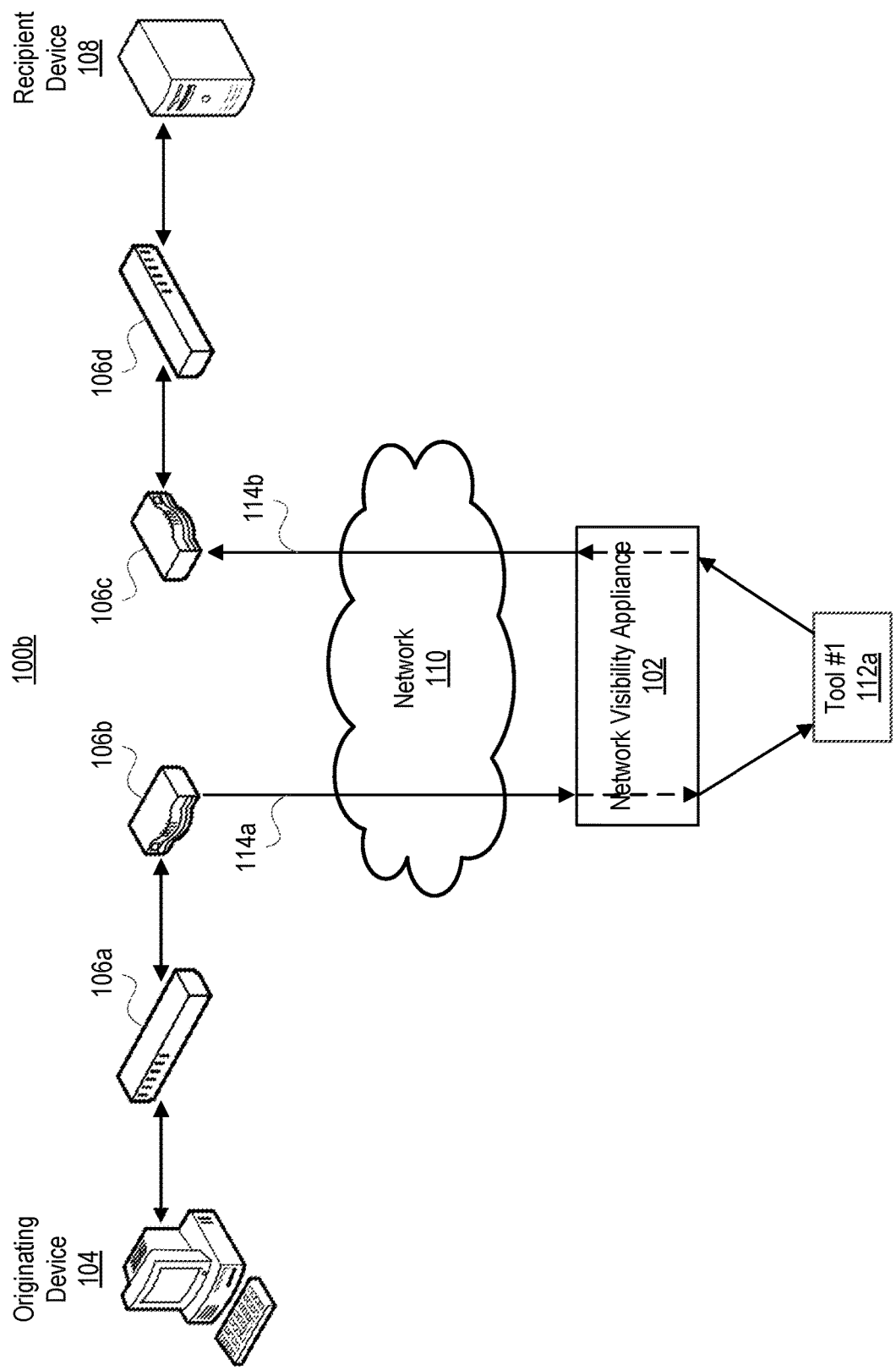
FIG. 1B illustrates an example path of a data packet as the data packet travels from an originating device to a recipient device.

FIG. 1B illustrates an example path of a data packet as the data packet travels from an originating device 104 to a recipient device 108. More specifically, FIG. 1B depicts a network arrangement 100b in which the network visibility appliance 102 and a network tool 112a are both deployed as inline devices (i.e., within the flow of network traffic). Although the transmission paths connecting the network visibility appliance 102 and network tool 112a are half duplex wires (i.e., only transmit information in one direction), full duplex wires capable of transmitting information in both directions could also be used for some or all of the transmission paths between nodes of the computer network 110.

After receiving a data packet from node 106b, the network visibility appliance 102 identifies a map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper map could be identified based on the network port of the network visibility appliance 102 at which the data packet was received, the source node from which the data packet was received, etc.

The map represents a policy for how the data packet is to be handled by the network visibility appliance 102. For example, the map could specify that the data packet is to be transmitted in a one-to-one configuration (i.e., from an ingress port of the network visibility appliance 102 to an egress port of the network visibility appliance 102), a one-to-many configuration (i.e., from an ingress port of the network visibility appliance 102 to multiple egress ports of the network visibility appliance 102), or a many-to-one configuration (i.e., from multiple ingress ports of the network visibility appliance 102 to an egress port of the network visibility appliance 102). Thus, a single egress port of the network appliance 102 could receive data packets from one or more ingress ports of the network appliance 102.

Often, the data packet is passed (e.g., by a processor of the network visibility appliance 102) to an egress port for transmission downstream to a network tool (e.g., a monitoring and/or security tool). Here, for example, the map may specify that the data packet is to be passed by the network visibility appliance 102 to a tool port for transmission downstream to network tool 112a. The network visibility appliance 102 may aggregate or modify the data packet in accordance with the policy specified by the map before passing the data packet to the egress port for transmission downstream to the network tool 112a. In some embodiments, the network visibility appliance 102 includes multiple egress ports, each of which is coupled to a different network tool or another network visibility appliance.

After analyzing the data packet, the network tool 112a normally transmits the data packet back to the network visibility appliance 102 (i.e., assuming the network tool 112a does not determine that the packet should be blocked), which passes the data packet to a network port for transmission downstream to another node (e.g., node 106c).

Figure 2:
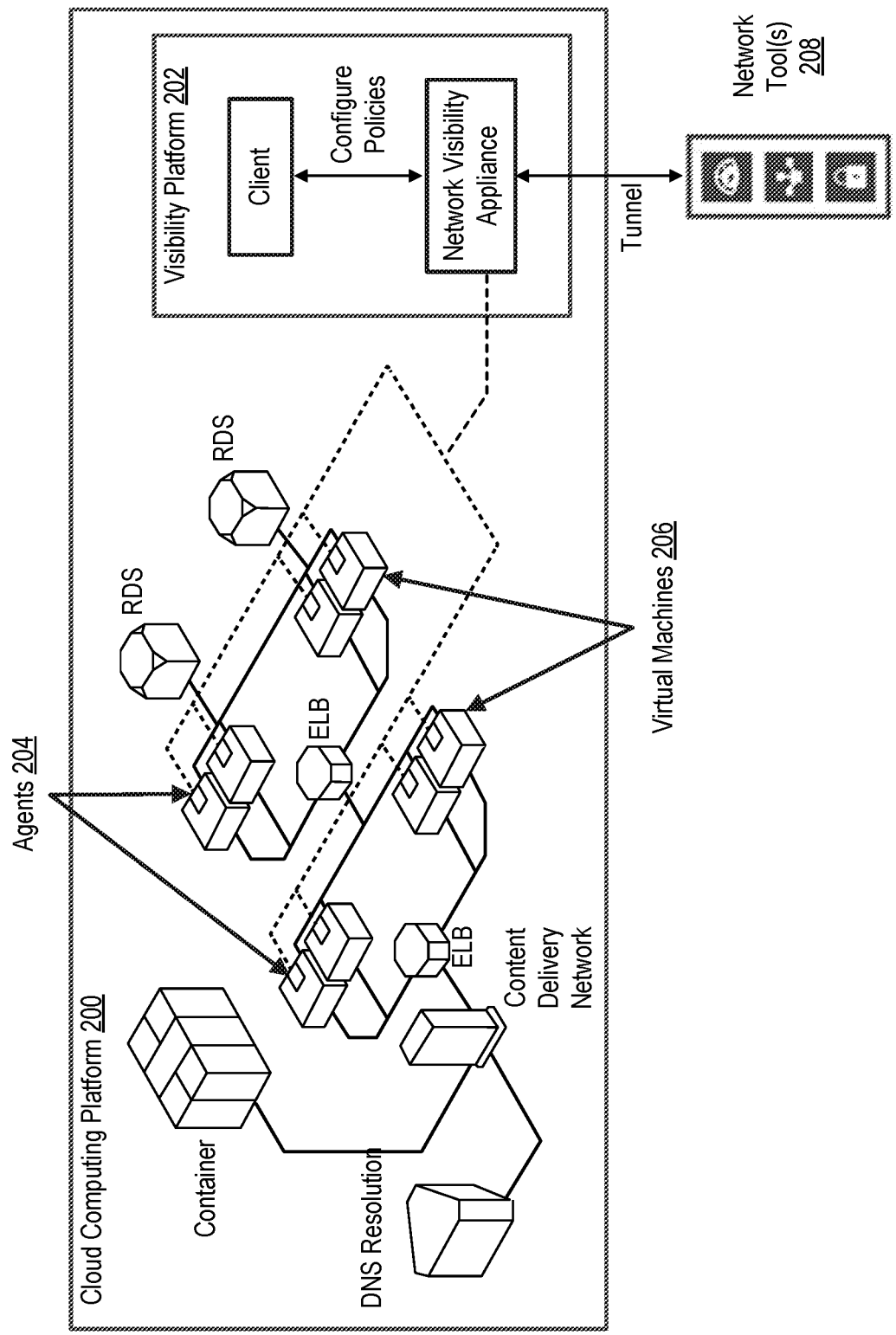
FIG. 2 depicts an example of how a visibility platform that includes a network visibility appliance can be integrated into a cloud computing platform to provide a coherent view of virtualized traffic in motion across the public cloud infrastructure for an end user.

FIG. 2 depicts an example of how a visibility platform 202 that includes a network visibility appliance can be integrated into a cloud computing platform 200 to provide a coherent view of virtualized traffic in motion across the public cloud infrastructure for an end user. Many end users (e.g., individuals and enterprises) have begun moving work processes and data to cloud computing platforms. By installing agents 204 on some or all of the virtual machines 206 belonging to the end user, the visibility platform 202 can acquire data packets (or duplicate copies of the data packets) traversing a public cloud infrastructure for further analysis in order to improve visibility into possible security risks.

In some embodiments, the visibility platform 202 is communicatively coupled to one or more network tools 208 for analyzing the virtualized traffic. The network tool(s) 208 can be hosted locally as part of the visibility platform 202 (i.e., on the cloud computing platform 200) or remotely (e.g., within an on-premises computing environment controlled by the end user). When the visibility platform 202 is entirely virtual (e.g., the network visibility appliance is comprised of a virtual programmable switch), the visibility platform 202 establishes a tunnel for delivering the virtualized traffic to the network tool(s) 208 regardless of where the network tool(s) 208 reside. However, when the visibility platform 202 is physical (e.g., the network visibility appliance is comprised of a physical programmable switch), the visibility platform 202 may establish a tunnel only for those network tool(s) 208 that are hosted remotely (e.g., are not directly coupled to the visibility platform 202 using physical cables).

A "tunnel" is a mechanism that can be used to reliably transmit traffic across a network. Before virtualized traffic is forwarded to the tunnel by the visibility platform 202 for transmission to the network tool(s) 208, the visibility platform 202 may create an outer jacket for the virtualized traffic (and any other network content) based on the type of tunnel. For example, an inner payload could be wrapped in an encapsulation by the visibility platform 202 in accordance with a Virtual Extensible LAN (VXLAN) protocol or a Generic Routing Encapsulation (GRE) protocol. The network tool(s) 208 can then remove the outer jacket upon reception and determine how the inner payload (i.e., the actual virtualized traffic) should be handled.

The visibility platform 202 can exist as a cloud-native virtual machine (also referred to as an "unnative virtual machine") that analyzes virtualized traffic traversing the cloud computing platform 200. Accordingly, the visibility platform 202 may not be limited by the computer hardware responsible for supporting the cloud computing platform 200.

Figure 3:
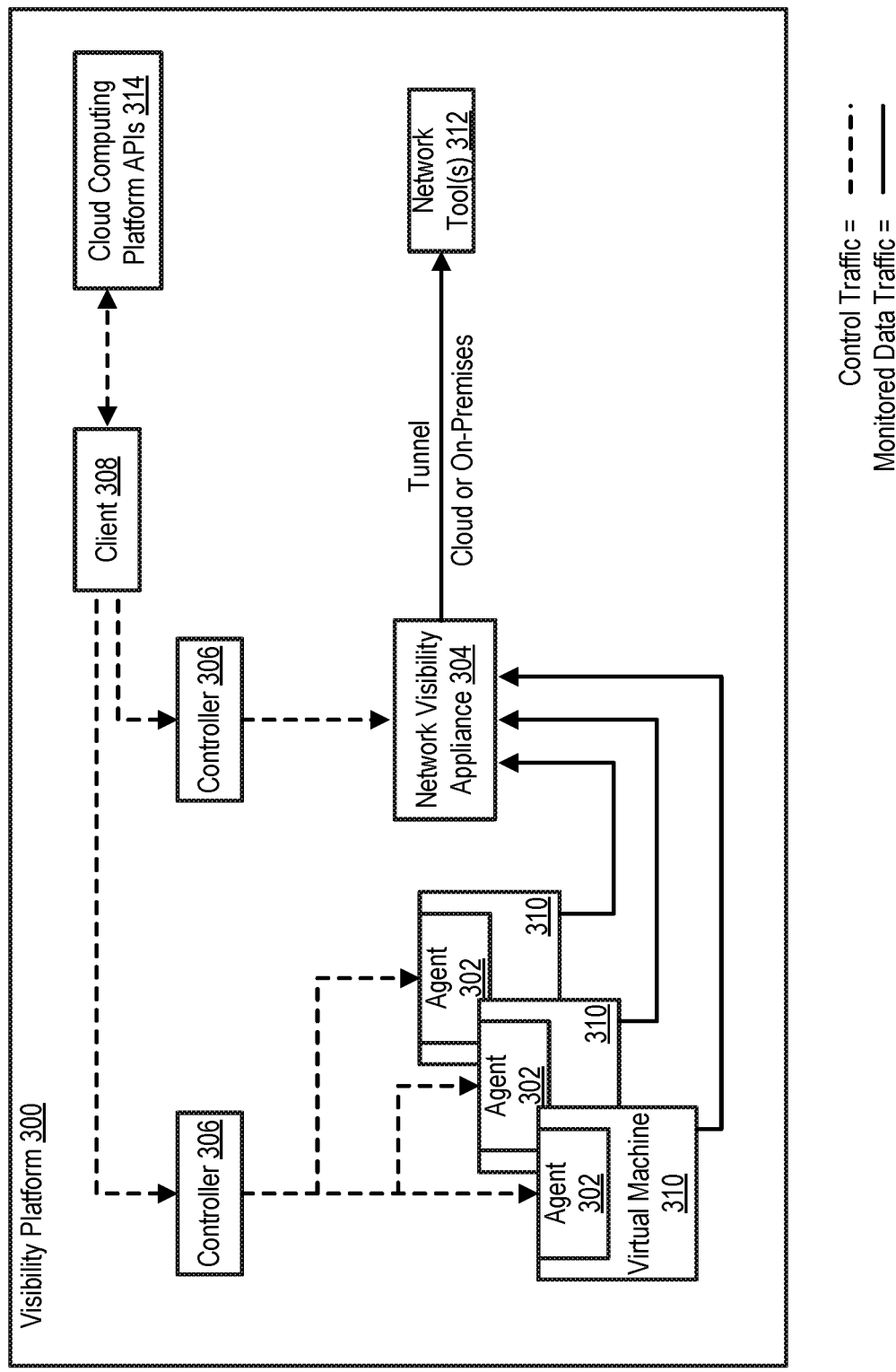
FIG. 3 depicts one embodiment of a visibility platform that can be run entirely within a cloud environment or a non-cloud environment (e.g., as a virtual machine).

FIG. 3 depicts one embodiment of a visibility platform 300 that can be run entirely within a cloud environment or a non-cloud environment (e.g., as a virtual machine). Thus, the visibility platform 300 may be hosted on a cloud computing platform, run on a dedicated piece of computer hardware (e.g., a monitoring platform that includes a chassis and interchangeable blades offering various functionalities, such as enhanced packet distribution and masking/filtering capabilities), or some combination thereof. For example, the visibility platform 300 could include a network visibility appliance 304 that resides on a stand-alone personal computer, a dedicated network server, or some other computing device having an x86 instruction set architecture.

In some instances, it may be desirable to run the network visibility appliance 304 as a virtual machine on a cloud computing platform (e.g., cloud computing platform 200 of FIG. 2). For example, the visibility platform 300 may exist inside of a Virtual Private Cloud (VPC) that resides within a dedicated section of an end user's virtual network within Amazon Web Services (AWS), VMware, OpenStack, etc. Such an arrangement permits the visibility platform 300 to intelligently optimize, filter, and analyze virtualized traffic across hundreds or thousands of virtual machines. Note, however, that the visibility platform 300 may also exist outside of the VPC.

The visibility platform 300 can include one or more agents 302 for mirroring virtualized traffic traversing a cloud computing platform, a network visibility appliance 304 for aggregating and filtering the virtualized traffic, one or more controllers 306, and a client 308 for managing the visibility platform 300 as a whole. Other embodiments may include a subset of these components.

As shown here, each agent 302 is fully contained within a corresponding target virtual machine 310 whose virtualized traffic is to be monitored. The term "virtualized traffic" generally refers to traffic that traverses a virtual machine. While the agent(s) 302 serve requests issued by the controller(s) 306, each agent 302 may be responsible for configuring its own interface mirrors, tunnels, etc.

The network visibility appliance 304 can include a programmable switch (also referred to as a "switching engine"). The programmable switch may be a physical switch or a virtual switch, such as a software-defined networking (SDN) switch. The network visibility appliance 304 is responsible for aggregating virtualized traffic mirrored by the agent(s) 302, and then forwarding at least some of the aggregated virtualized traffic to one or more network tools 312 for further analysis. In some embodiments, the network visibility appliance 304 filters (e.g., slices, masks, or samples)

and/or replicates the aggregated virtualized traffic before forwarding it downstream to the network tool(s) 312.

The controller(s) 306, meanwhile, may be controlled by the end user via the client 308, which may be hosted on the cloud computing platform on in an on-premises computing environment controlled by the end user. In some embodiments a single controller 306 is configured to control the agent(s) 302 and the programmable switch 304, while in other embodiments multiple controllers 306 are configured to control the agent(s) 302 and the network visibility appliance 304. Here, for example, a first controller controls the agent(s) 302 and a second controller controls the network visibility appliance 304. However, each agent 302 could also be associated with a dedicated controller.

Together, the client 308 and the controller(s) 306 enable centralized management of the visibility platform 300 as a whole. For example, the client 308 may be configured to integrate with one or more application programming interfaces (APIs) 314 offered by the cloud computing platform in order to retrieve relevant information about the virtualized traffic being monitored (e.g., end user credentials, virtual machine addresses, virtualized traffic characteristics). In some embodiments, the client 308 supports a drag-and-drop user interface that can be used by the end user to create and implement traffic policies. Moreover, the client 308 may provide traffic policy statistics to the end user or an administrator (e.g., the manager of the visibility platform 300) for troubleshooting in real time.

By identifying the network object(s) interconnected through a visibility fabric, a traffic flow can be readily monitored regardless of whether the network visibility appliance 304 is monitoring data packets traversing a physical device or a virtual environment. Examples of network objects include raw endpoints, tunnel endpoints, application endpoints, and maps. A network visibility appliance may include one or more raw endpoints that receive traffic direction from corresponding Network Interface Cards (NICs) or virtual Network Interface Cards (vNICs). The network visibility appliance may also include one or more tunnel endpoints that send/receive traffic to/from remote locations. Examples of remote locations include other network visibility appliances, on-premises computing environments, etc. Tunnel endpoints can be created by the network visibility appliance using APIs, and tunnel endpoints are typically associated with both a remote endpoint and a specific type (e.g., VXLAN or GRE).

The network visibility appliance may also include one or more application endpoints that send/receive packets to/from application programs (also referred to as "applications"). Applications may be responsible for creating, aggregating, filtering, and/or modifying the virtualized traffic received by the network visibility appliance. Examples of applications can include masking programs, deep packet inspection programs, net flow generation programs, deduplication programs, etc.

The network visibility appliance can receive traffic at raw endpoints, tunnel endpoints, and application endpoints, and the network visibility appliance can output traffic at tunnel endpoints and application endpoints. Raw endpoints, therefore, can only receive incoming traffic, while tunnel endpoints and application endpoints are generally bi-directional (i.e., can receive and transmit traffic across different ingress and egress interfaces).

Raw endpoints can receive traffic directly from (v)NICs. However, tunnel endpoints are often the predominant way to route traffic away from a network visibility appliance (e.g., into an on-premises environment that includes one or more network tools). Moreover, although application endpoints route virtualized traffic into an environment managed by an application, the environment still typically resides within the network visibility appliance.

Distributed Packet Deduplication by Network Visibility Appliances

Deduplication programs have traditionally been used to eliminate duplicate copies of data packets in the traffic observed within a temporal window. In a computer network, there are several different scenarios in which duplicate copies of data packets can be generated.

First, duplicate copies of data packets may be spuriously generated by an application that resides on a network visibility appliance. One example of such an application is a net flow generation program. Because these duplicate copies are generated on a single network visibility appliance, a local instance of a deduplication program that resides on the network visibility appliance can readily filter these duplicate copies before the traffic leaves the network visibility appliance.

Second, duplicate copies of data packets may be generated by a source node (e.g., a network visibility appliance) during a broadcast process. For example, if the source node intends to discover where a destination node is located within a computer network, the source node may transmit a query message to one or more intermediate nodes (e.g., switches, routers, etc.). Each intermediate node will make a copy of the query message and then forward it onward to one or more other nodes. Such action is performed with the intention that a copy of the query message will eventually reach the destination node, which can then send a reply to the source node that includes a destination address. From that point onwards, the source node and the destination node can communicate with each other via a point-to-point communication protocol.

Duplicate copies of data packets may also be generated by a source node during a multicast process. In a multicast process, the source node transmits a message to multiple destination nodes rather than sending each destination node a separate message. Broadcast processes are normally avoided unless necessary to identify the location of a destination node, while multicast processes are often used to efficiently provide updates to multiple destination nodes.

Figure 4:
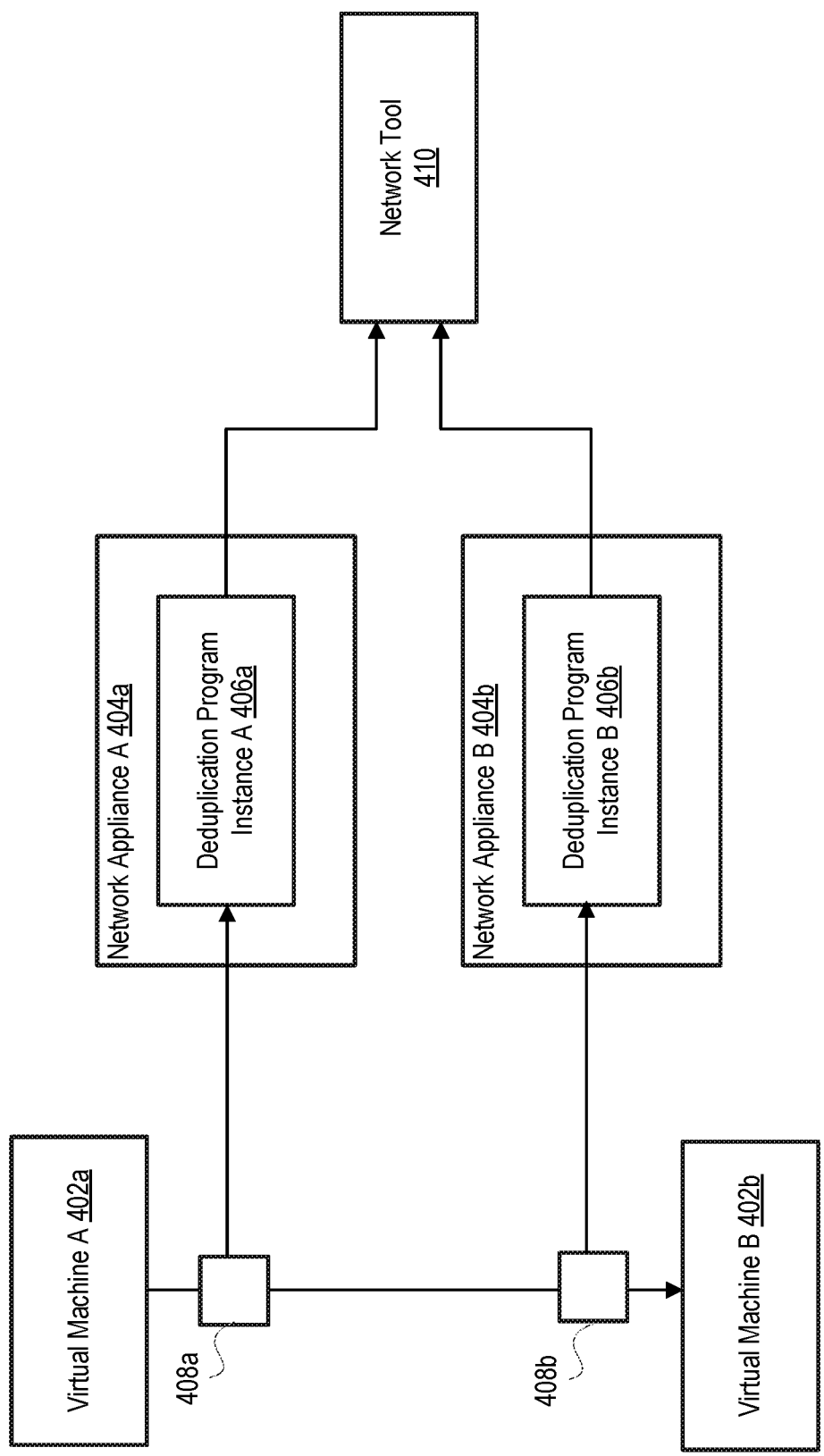
FIG. 4 illustrates how separate instances of a deduplication program can be configured to monitor traffic associated with multiple virtual machines.

Third, duplicate copies of data packets may be observed by a network appliance simply because it is monitoring virtualized traffic. As shown in FIG. 4, separate instances of a deduplication program can be configured to monitor traffic associated with multiple virtual machines. Here, for example, Deduplication Program Instance A 406a residing on Network Appliance A 404a is configured to examine traffic that exits Virtual Machine A 402a, while Deduplication Program Instance B 406b residing on Network Appliance B 404b is configured to examine traffic that enters Virtual Machine B 402b. In some embodiments, the traffic is collected from each virtual machine by an agent that, when deployed, resides on the virtual machine. In other embodiments, the traffic is collected from each virtual machine by some other type of flow collector 408a-b that, when deployed, resides outside of the virtual machine. For example, each flow collector 408a-b may interface with the appropriate cloud computing platform to request traffic corresponding to one or more virtual machines.

When Virtual Machine A 402a communicates with Virtual Machine B 402b, the same data packet will be captured twice. Deduplication Program Instance A 406a will examine the data packet that is captured as it exits Virtual Machine A 402a and Deduplication Program Instance B 406b will examine the data packet that is captured as it enters Virtual Machine B 402b. However, because each instance of the deduplication program only identifies duplicate copies of data packets within the traffic received by the corresponding network appliance, neither Deduplication Program Instance A 406a nor Deduplication Program Instance B 406b will eliminate the data packet involved in the communication. If Network Appliance A 404a and Network Appliance B 404b are configured to forward filtered traffic onward to a network tool 410, the network tool 410 will receive duplicate copies of the data packet.

Introduced here, therefore, are techniques for achieving distributed deduplication by intelligently routing traffic amongst multiple instances of a deduplication program. Each instance of the deduplication program may reside on a different network visibility appliance. Together, the multiple network visibility appliances on which the multiple instances of the deduplication program reside form a pool of network visibility appliances capable of implementing a distributed deduplication scheme. These network visibility appliances can route traffic amongst the multiple instances of the deduplication program in such a manner that duplicate copies of data packet are guaranteed to arrive at the same instance of the deduplication program, regardless of which network visibility appliance(s) initially received the duplicate copies of the data packet.

Figure 5:
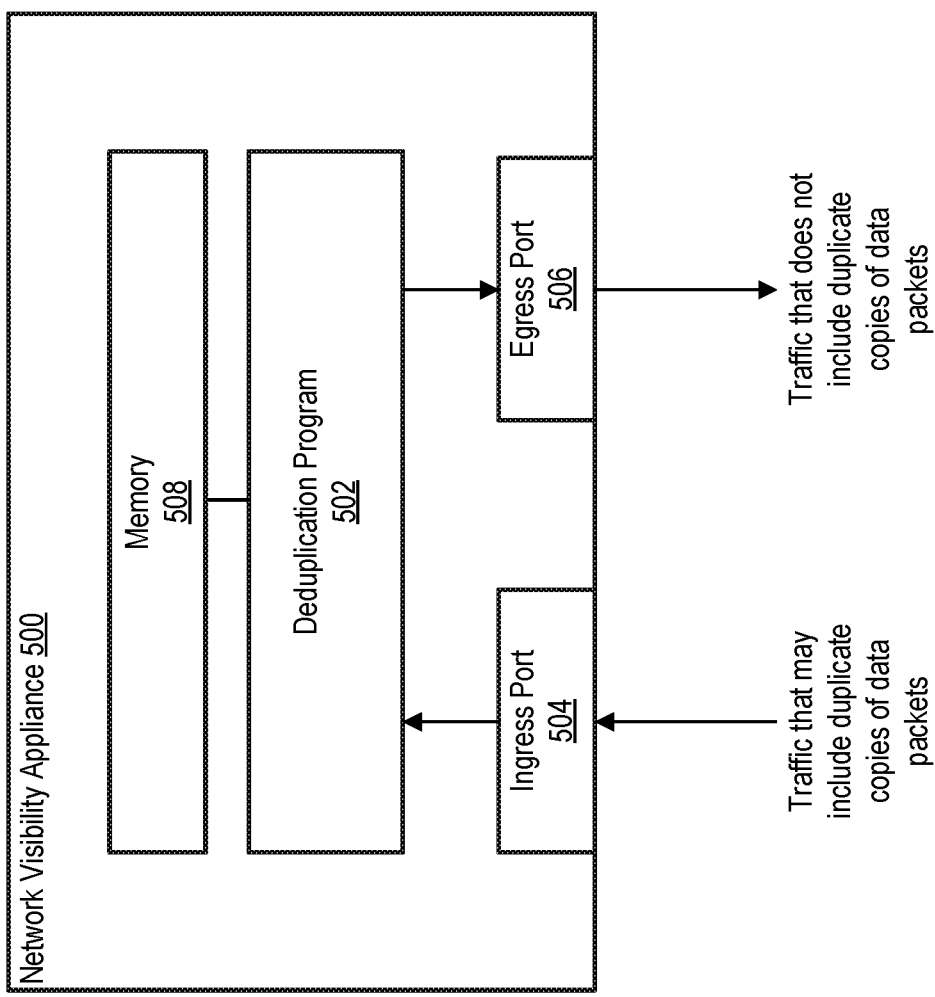
FIG. 5 depicts an example of a network visibility appliance that includes a deduplication program capable of filtering duplicate copies of data packets from traffic received at an ingress port.

FIG. 5 depicts an example of a network visibility appliance 500 that includes a deduplication program 502 capable of filtering duplicate copies of data packets from traffic received at an ingress port 504. Generally, the deduplication program 502 filters traffic to ensure that duplicate copies of data packets are not forwarded downstream to a network tool via an egress port 506 (also referred to as a "tool port").

In a deduplication process, the deduplication program 502 initially identifies data packets received at the ingress port 504 and then stores the data packets (e.g., in memory 508) during an identification stage. Alternatively, the deduplication program 502 may populate a data structure in the memory 508 with information regarding the data packets received at the ingress port 504. For example, the data structure may include a separate record for each received data packet that specifies one or more characteristics (e.g., source, packet length, destination, protocol). As the deduplication process continues, the deduplication program 502 compares other data packets received at the ingress port 504 to the data packets stored in the memory 508 or the data structure. Whenever a match occurs, the redundant data packet is filtered from the traffic before the traffic is forwarded downstream via the egress port 506. Such action ensures that a recipient (e.g., a network tool) is not inundated with duplicate copies of data packets. In some embodiments, the redundant data packet is replaced with a reference that identifies the matching stored data packet.

In some embodiments, the deduplication program 502 compares an entire received data packet to the data packets stored in the memory 508. In such embodiments, the deduplication program 502 may determine that the received data packet is a duplicate copy only if it is a complete match with a stored data packet. In other embodiments, the deduplication program 502 compares certain field(s) of a received data packet to corresponding field(s) of the stored data packets. This technique (also referred to as the "field matching technique") may be used in networking situations to reduce latency caused by filtering. Said another way, the field matching technique is often employed in networking situations because the network visibility appliance 500 must forward the traffic received at the ingress port 504 within a specified timeframe.

Moreover, data packets received by the network visibility appliance 500 at the ingress port 504 can come in a variety of sizes. For example, data packets can range from 64 bytes to over 9,000 bytes. When the deduplication program 502 is executed by a physical programmable switch, these large data packets can be handled without issue. However, when the deduplication program 502 is executed by a virtual programmable switch, these large data packets cannot be handled without resulting in undesirable latency. Therefore, the field matching technique may be employed by virtual programmable switches to squash duplicate copies of data packets with high confidence without examining the entire payload.

As noted above, the deduplication program 502 will only compare incoming data packets to those data packets stored in the memory 508 of the network visibility appliance 500. However, many end users have a sufficiently large volume of traffic that multiple network visibility appliances, each running a separate instance of the deduplication program, must be used to monitor the traffic. In a distributed environment of multiple network visibility appliances, it is important that all potential duplicate copies of a data packet be examined by the same instance of the deduplication program. Load balancing mechanisms (also referred to as "load balancers") may be used to ensure that the traffic received at a given network visibility appliances is properly distributed amongst the multiple network visibility appliances.

Figure 6:
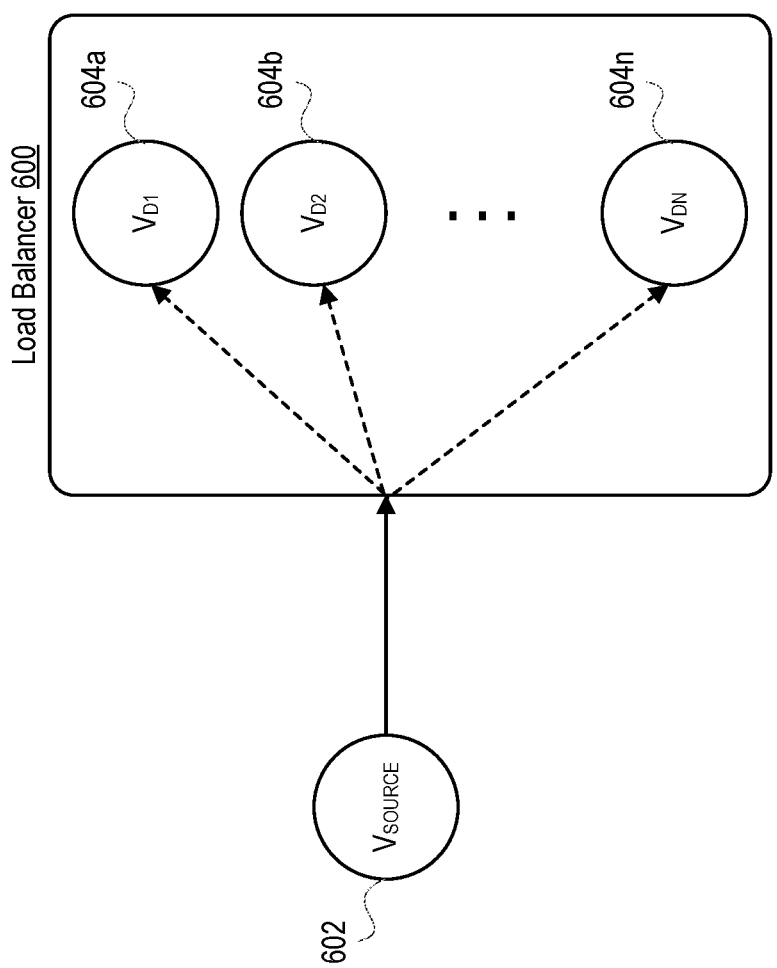
FIG. 6 depicts an example of a load balancer that is configured to distribute data packets received from a source node amongst multiple destination nodes in accordance with a load balancing strategy.

FIG. 6 depicts an example of a load balancer 600 that is configured to distribute data packets received from a source node 602 amongst multiple destination nodes 604a-n in accordance with a load balancing strategy. The source node 602 may be an agent deployed on a virtual machine, a flow collector deployed outside of a virtual machine, a cloud computing platform, etc. The destination nodes 604a-n, meanwhile, may be network visibility appliances having separate instances of a deduplication program. Thus, the load balancer 600 can ensure that traffic received by a pool of multiple network appliances is distributed amongst the multiple network appliances in a roughly equivalent manner.

The load balancer 600 examines incoming traffic to determine which destination node of the multiple destination nodes 604a-n each data packet should be forwarded to. To properly balance the incoming traffic across the multiple destination nodes 604-a, the load balancing mechanism 600 can apply a transformation function that creates a value for each data packet and then identify the appropriate destination node for each data packet based on the corresponding value. One example of a transformation function is the highest random weight (HRW) hashing algorithm (also referred to as the "rendezvous hashing algorithm"). The HRW hashing algorithm is designed to achieve distributed agreement on a set of k options out of a possible set of n options.

When executed by the load balancer 600, the HRW hashing algorithm will assign each destination node ($V_{Dj}$) a weight for each data packet in the incoming traffic, and then forward each data packet to the destination node having the largest weight. As further described below, multiple load balancers can be used to ensure that duplicate copies of data packets are forwarded to the same destination node. Proper distribution, however, requires that each load balancer execute the same transformation function. For example, each load balancer involved in a distributed deduplication scheme may apply an identical hash function. When a transformation function is agreed upon by all load balancers in a visibility fabric, each load balancer can independently route traffic based on values computed using the transformation function. For example, each load balancer may independently compute weights using the HRW hashing algorithm and then pick whichever destination node corresponds to the largest weight.

Figure 7A:
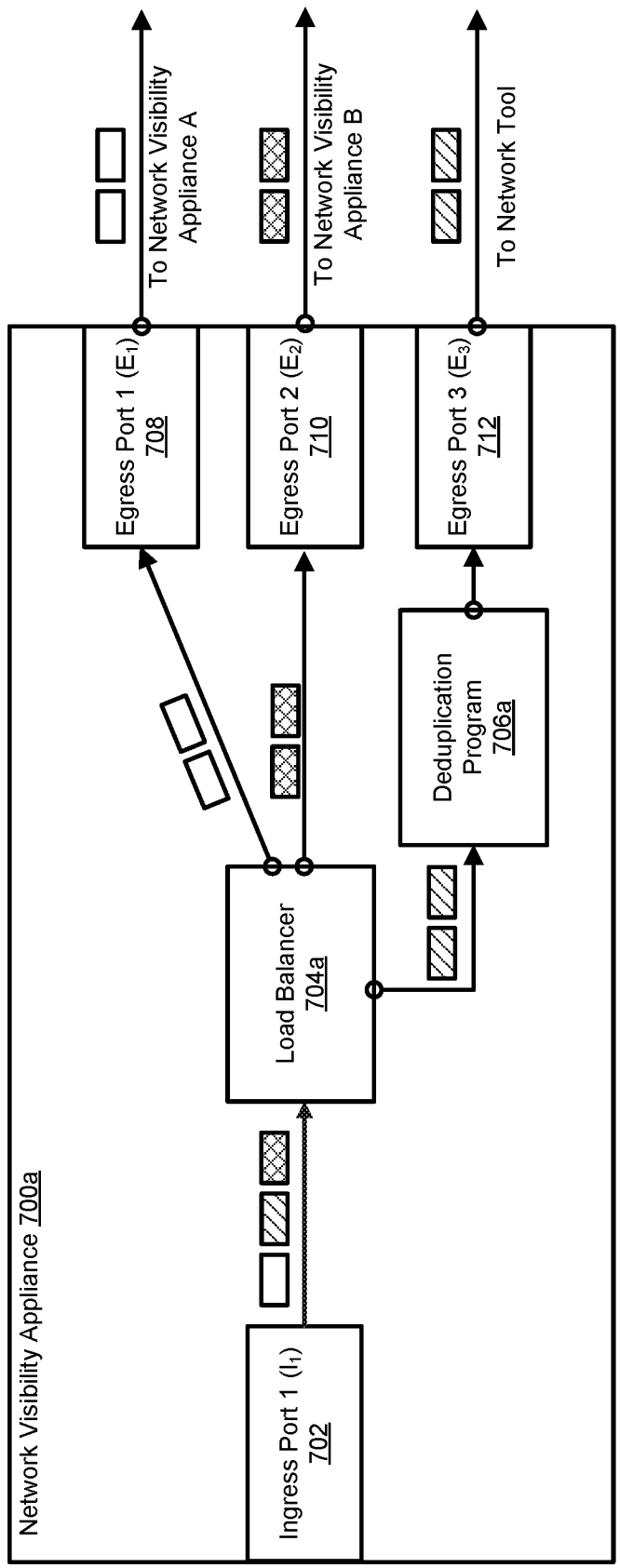
FIG. 7A depicts an example of a network visibility appliance that includes a load balancer that is configured to distribute incoming traffic amongst multiple instances of a deduplication program.

FIG. 7A depicts an example of a network visibility appliance 700a that includes a load balancer 704a that is configured to distribute incoming traffic amongst multiple instances of a deduplication program. After receiving data packets at an ingress port 702, the network visibility appliance 700a can split the data packets into multiple batches using the load balancer 704a. For example, the load balancer 704a may apply a transformation function that causes a value to be generated for each data packet, and then separate the data packets into batches based on these values. The value assigned to each data packet may be based on data packet characteristics, such as the communication protocol of which the data packet is a part (e.g., HTTP, TCP, UDP, IPv4, IPv6), a sequence number, a session feature (e.g., a timestamp), the ingress port at which the data packet was received, a source address, a destination address, header length, payload length, etc. Additionally or alternatively, the value assigned to each data packet may be based on the content of a certain field included in, for example, the header.

Here, the load balancer 704a is configured to split the data packets into three separate batches. Data packets having a first value (or a value within a first set of values) will be filtered into a first batch, data packets having a second value (or a value within a second set of values) will be filtered into a second batch, and data packets having a third value (or a value within a third set of values) will be filtered into a third batch. The load balancer 704a may also be able to access a data structure that specifies how each batch of data packets should be handled. Here, the third batch of data packets is forwarded to a deduplication program 706a for examination. Data packets in the third batch that survive examination by the deduplication program 706a can be forwarded to a third egress port 712 for transmission downstream to a network tool. Meanwhile, the first batch of data packets and the second batch of data packets are forwarded to a first egress port 708 and a second egress port 710, respectively, for transmission downstream to different network visibility appliances. This may be done so that the first batch of data packets and the second batch of data packets can be examined by other instances of the deduplication program that reside on other network visibility appliances. For example, transmission of the first batch of data packets to Network Visibility Appliance A may cause the first batch of data packets to be examined by an instance of the deduplication program that resides on Network Visibility Appliance A. Similarly, transmission of the second batch of data packets to Network Visibility Appliance B may cause the second batch of data packets to be examined by an instance of the deduplication that resides on Network Visibility Appliance B.

In some embodiments, the load balancer 704a has access to a data structure that maps values amongst multiple network visibility appliances or multiple instances of the deduplication program. Each value may be mapped to a single network visibility appliance or single instance of the deduplication program. Accordingly, to determine which batch a given data packet belongs to, the load balancer 704a can access the data structure to determine which network visibility appliance or instance of the deduplication program is specified by an entry corresponding to the value created for the given data packet. As further described below, the data structure may be dynamically edited responsive to detecting a change in the status of a network visibility appliance. Accordingly, if an existing network visibility appliance becomes inaccessible, all entries in the data structure corresponding to the existing network appliance can be remapped to different network visibility appliance(s). Similarly, if a new network visibility appliance becomes accessible, one or more entries in the data structure corresponding to existing network visibility appliance(s) can be remapped to the new network visibility appliance. Generally, the load balancer 704a is completely client-based. Thus, the load balancer 704a may be able to fully function without communicating with either the network visibility appliance(s) to which it may transmit traffic or the virtual machine(s) from which it may receive traffic.

Figure 7B:
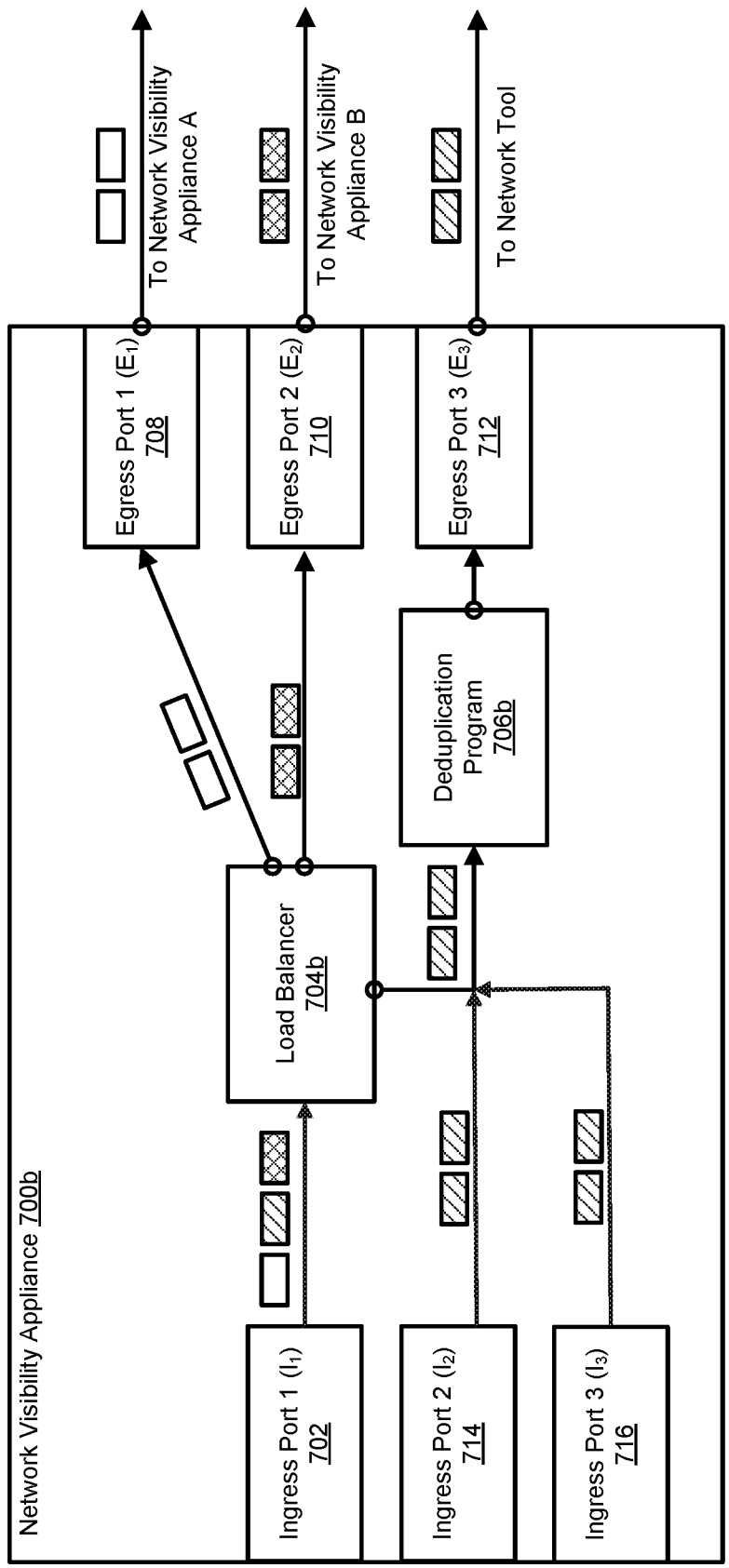
FIG. 7B depicts another example of a network visibility appliance that includes a load balancer configured to sort incoming data packets into batches to be distributed amongst multiple instances of a deduplication program.

FIG. 7B depicts another example of a network visibility appliance 700b that includes a load balancer 704b configured to sort incoming data packets into batches to be distributed amongst multiple instances of a deduplication program. For data packets received at ingress port 702, the load balancer 704b of FIG. 7B may operate the same as the load balancer 704a of FIG. 7A. Thus, a first batch of data packets and a second batch of data packets may be forwarded to a first egress port 708 and a second egress port 710, respectively, for transmission downstream to different network appliances, while a third batch of data packets may be forwarded to a deduplication program 706b for examination. Here, however, the network visibility appliance 700b also receives data packets at a second ingress port 714 and a third ingress port 716. These data packets may have been forwarded to the network visibility appliance 700b by the other network visibility appliances that are connected to the first egress port 708 and the second egress port 710.

Generally, the data packets received at the second ingress port 714 and the third ingress port 716 correspond to batches created by the load balancers residing on each of these other network appliances. For example, a load balancer residing on Network Visibility Appliance A may have created a batch of data packets that is subsequently received by the network visibility appliance 700b at the second ingress port 714. Similarly, a load balancer residing on Network Visibility Appliance B may have created a batch of data packets that is subsequently received by the network visibility appliance 700b at the third ingress port 716. Rather than be directed to the load balancer 704b, these data packets may be forwarded directly to the deduplication program 706b for examination. Such action may occur if other load balancers (e.g., those residing on Network Visibility Appliance A and Network Visibility Appliance B) have determined that these data packets should be examined by the load balancer 704b. Note, however, that these data packets could instead forwarded to the load balancer 704b. Because the load balancer 704b applies the same transformation function as the other load balancers, all of the data packets received at the second ingress port 714 and the third ingress port 716 will be sorted into the third batch that is forwarded to the deduplication program 706b for examination.

Figure 8A:
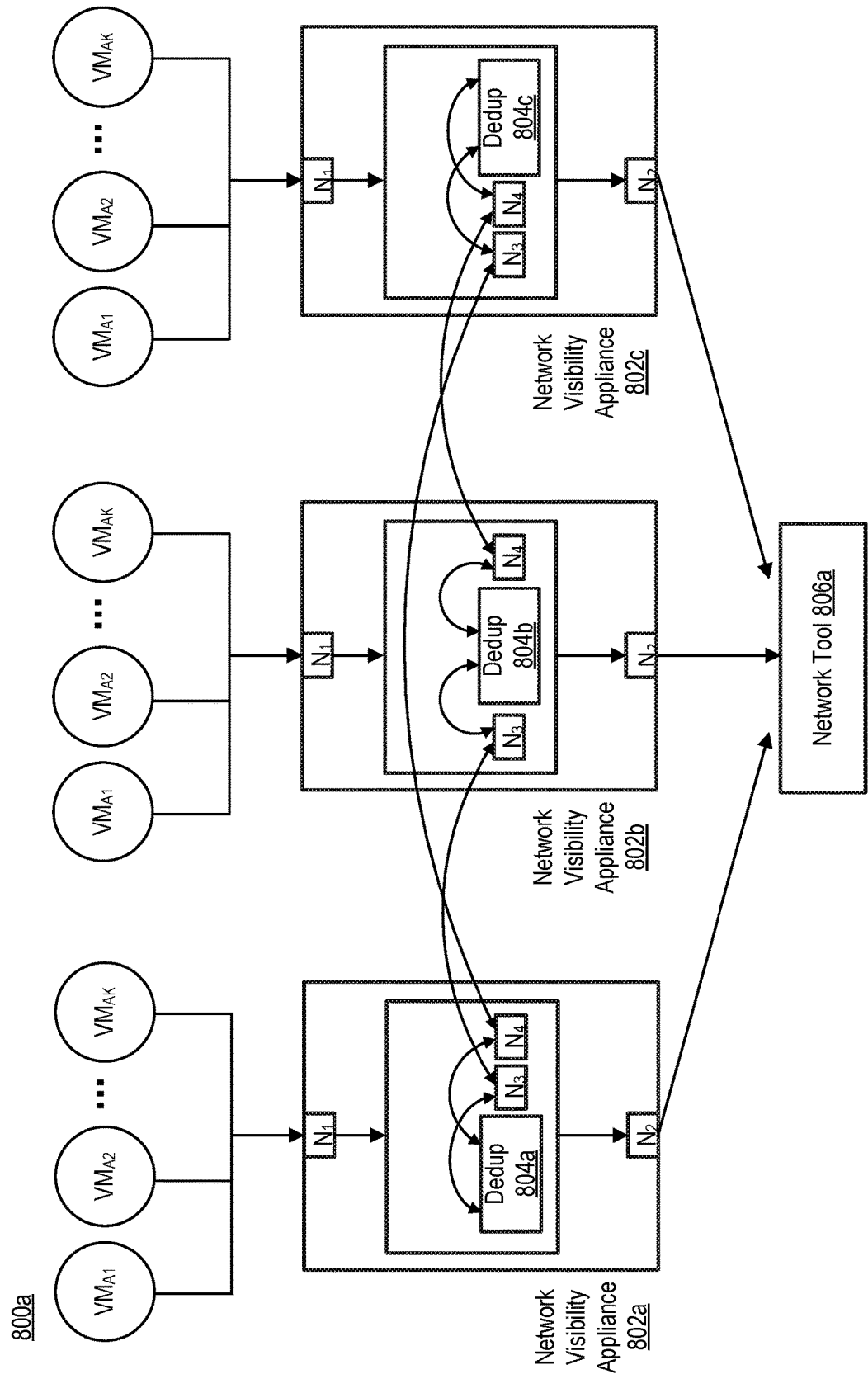
FIG. 8A depicts an example of a distributed visibility fabric that includes multiple visibility appliances, each of which executes an instance of a deduplication program and a load balancer (not shown).
Figure 8B:
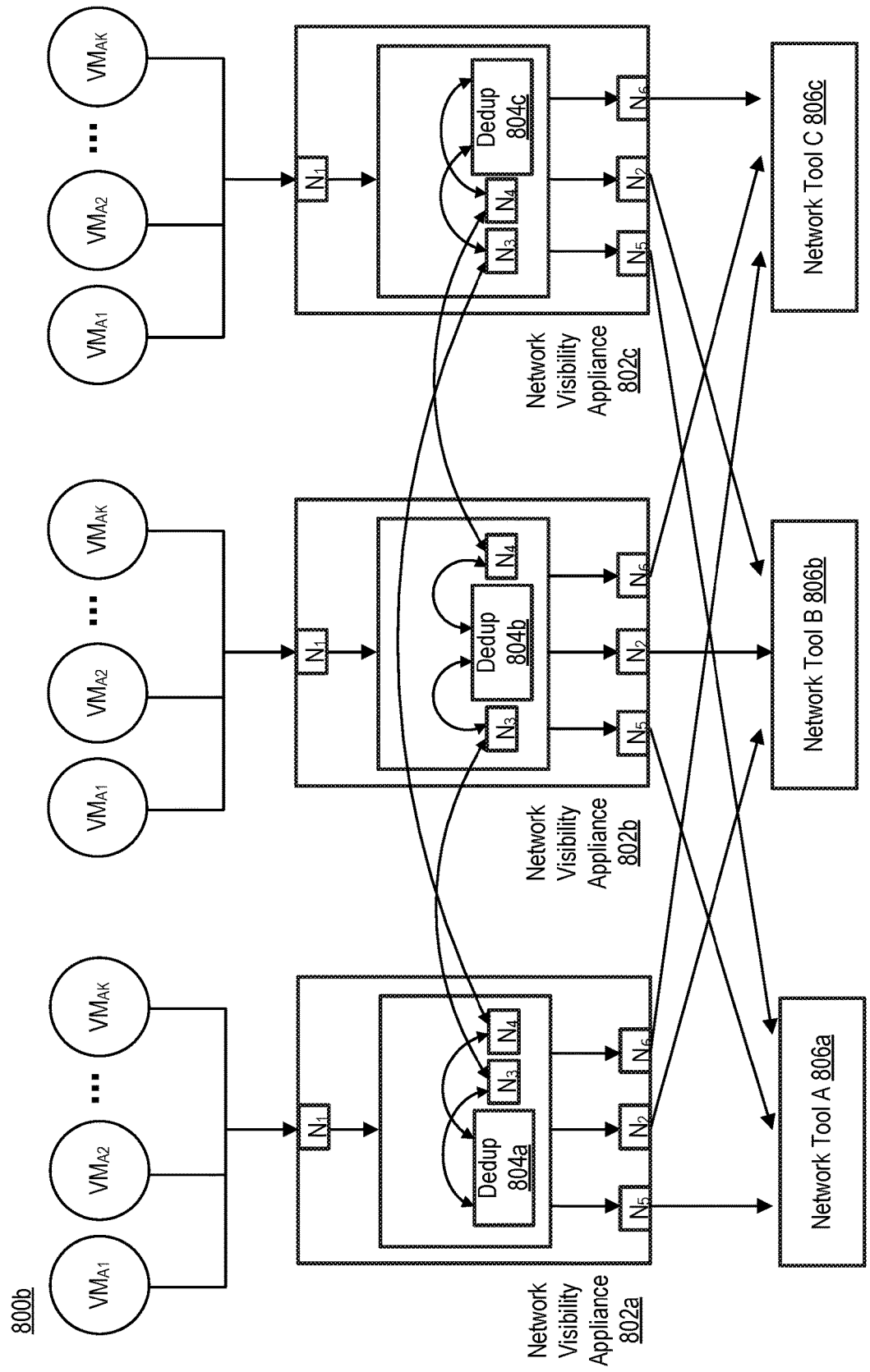
FIG. 8B depicts another example of a distributed visibility fabric that includes multiple network tools.

FIG. 8A depicts an example of a distributed visibility fabric 800a that includes multiple visibility appliances 802a-c, each of which executes an instance of a deduplication program 804a-c and a load balancer (not shown). FIG. 8B depicts another example of a distributed visibility fabric 800b that includes multiple network tools 806a-c. By working in concert with one another, the multiple visibility appliances 802a-c can ensure that potential duplicate copies of a data packet will be examined by the same instance of the deduplication program.

Each network visibility appliance can receive traffic at a network port. Here, for example, network visibility appliance 802a receives virtualized traffic corresponding to a series of virtual machines (i.e., $VM_{A1}, VM_{A2}, \ldots VM_{AK}$) at a first network port ($N_1$). The first network port may also be referred to as an "ingress port." Upon receiving the traffic, a load balancer can sort the data packets into one or more batches as shown in FIGS. 7A-B. Here, the load balancer has sorted the data packets into three separate batches of data packets. A first batch of data packets can be forwarded to a local deduplication program 804a for examination. As shown in FIG. 8A, data packets in the first batch that survive examination by the local deduplication program 804a can be forwarded to a second network port ($N_2$) for transmission downstream to a network tool 806. The second network port may also be referred to as a "tool port." As shown in FIG. 8B, data packets in the first batch that survive examination by the local deduplication program 804a could also be forwarded to multiple tool ports. For example, the network visibility appliance 802a may apply additional filter(s) to the surviving data packets in the first batch to determine whether certain subsets of these data packets should be dropped, modified, forwarded to a certain type of network tool, etc.

Meanwhile, a second batch of data packets and a third batch of data packets can be forwarded to different network ports for transmission downstream. Here, for example, the second batch of data packets is forwarded to a third network port ($N_3$) for transmission to network visibility appliance 802b and the third batch of data packets is forwarded to a fourth network port ($N_4$) for transmission to network visibility appliance 802c. The third and fourth network ports may also be referred to as "egress ports."

Each network visibility appliance will typically operate in a substantially similar manner. Thus, each network visibility appliance may use a load balancer to sort incoming data packets into batches, identify at least one batch to be forwarded to a local deduplication program for examination, identify at least one batch to be forwarded to another network visibility appliance for examination by a remote deduplication program, etc. However, if each load balancer is configured to apply the same transformation function, then each instance of the deduplication program will examine different subsets of traffic. This ensures that data packets will be forwarded in such a manner that duplicate copies of a data packet are guaranteed to arrive at the same instance of the deduplication program, regardless of which network visibility appliance(s) initially received the duplicate copies of the data packet.

For example, network visibility appliance 802a may receive traffic that is sorted into three separate batches of data packets based on the value assigned to each data packet by a first load balancer. The first load balancer may determine that a first batch of data packets should be forwarded to deduplication program 804a for examination. The first batch of data packets may include all data packets in the traffic that have a certain characteristic. Meanwhile, network visibility appliance 802b may receive traffic that is also sorted into three separate batches of data packets based on the value assigned to each data packet by a second load balancer. The second load balancer may determine that a second batch of data packets should be examined by deduplication program 804a because these data packets share the certain characteristic in common with the first batch of data packets. Thus, the load balancer residing on network visibility appliance 802b may cause the second batch of data packets to be forwarded to a network port (e.g., $N_3$) for transmission to network visibility appliance 802a. Such action can be carried out across the multiple network visibility appliances 802a-c to ensure that duplicate copies of a data packet will be examined by the same instance of the deduplication program.

FIG. 9 depicts a process 900 for achieving distributed deduplication by intelligently routing traffic amongst multiple instances of a deduplication program. Initially, traffic is received at an ingress port of a network visibility appliance (step 901). The traffic may include, for example, virtualized traffic associated with one or more virtual machines.

The network visibility appliance can then prompt a load balancer to apply a transformation function to generate a value for each data packet (step 902), and then access a data structure that maps the values amongst multiple instances of a deduplication program or multiple network visibility appliances (step 903). Generally, each value is mapped to only a single instance of the deduplication program. Accordingly, when the load balancer accesses the data structure, the load balancer will be able to identify a single destination for a given data packet. In some embodiments, the load balancer separates the traffic into multiple batches of data packets based on these values (step 904). For example, the load balancer may create a first batch that includes all data packets corresponding to entries in the data structure that specify a first instance of the deduplication program, a second batch that includes all data packets corresponding to entries in the data structure that specify a second instance of the deduplication program, etc.

The load balancer can forward at least one batch of data packets to a local instance of the deduplication program for examination (step 905). Data packets in the at least one batch that survive examination by the local instance of the deduplication program may be forwarded to a tool port for transmission to a network tool. The load balancer can also forward at least one other batch of data packets to an egress port for transmission to a second network visibility appliance (step 906). Such action may occur if the load balancer determines (e.g., by examining the data structure) that the at least one other batch is to be examined by a remote instance of the deduplication program that resides on the second network visibility appliance.

In some embodiments, the network visibility appliance can be configured to dynamically modify the data structure to alter traffic distribution patterns as existing network visibility appliances become unavailable, new network visibility appliances become available, etc. For example, the network visibility appliance may receive an indication that the second network visibility appliance is not presently accessible (step 907). In such embodiments, the network visibility appliance may modify entries in the data structure that correspond to the at least one other batch of data packets to indicate a third instance of the deduplication program or a third network visibility appliance (step 908). Modifying the entries will cause the load balancer to forward the at least one other batch of data packets to another egress port for transmission to the third network visibility appliance.

Moreover, the network visibility appliance may be configured to receive a batch of data packets at another ingress port. As shown in FIGS. 8A-B, the batch of data packets may be transmitted by another network visibility appliance (e.g., the second network visibility appliance or the third network visibility appliance) responsive to a determination that the batch of data packets is to be examined by the local instance of the deduplication program. In such embodiments, the batch of data packets can be forwarded to the local instance of the deduplication program for examination.

FIG. 10 depicts a process 1000 for implementing a distributed deduplication scheme. While the steps of process 1000 may be described as being performed by a controller configured to manage multiple network visibility appliances, those skilled in the art will recognize that the steps could also be performed by one of the network visibility appliances.

Initially, a controller identifies multiple network visibility appliances to be included in a distributed deduplication scheme (step 1001). In some embodiments, each network visibility appliance of the multiple network visibility appliances is associated with the same end user (e.g., individual or enterprise). In other embodiments, the proper number of network visibility appliances is determined based on the volume of traffic expected to be examined. Traffic volume may be estimated based on historical volumes, the number of virtual machines to be monitored, etc.

The controller can then instantiate a separate load balancer on each network visibility appliance (step 1002), as well as instantiate a separate instance of a deduplication program on each network visibility appliance (step 1003). As described above, the multiple instances of the deduplication program may be used to filter volumes of traffic that couldn't be handled by a single deduplication program.

The controller can also establish a communication channel between each network visibility appliance (step 1004). To facilitate the creation of each communication channel, the controller may configure an ordered list of network ports for each load balancer as shown in Table I.

TABLE I

Ordered list of network ports for each load balancer instantiated on a pool of n network visibility appliances, where $D_i$ is the deduplication program instance on network visibility appliance i and $V_i$ is a tunnel connection to network visibility appliance i.

| Network Visibility Appliance | Ordered List of Network Ports |
|---|---|
| 1 | $[D_1, V_2, \ldots V_{n-1}, V_n]$ |
| 2 | $[V_1, D_2, \ldots V_{n-1}, V_n]$ |
| ... | ... |
| i | $[V_1, V_2, \ldots, V_{i-1}, D_i, V_{i+1}, \ldots, V_{n-1}, V_n]$ |
| ... | ... |
| n − 1 | $[V_1, V_2, \ldots D_{n-1}, V_n]$ |
| n | $[V_1, V_2, \ldots V_{n-1}, D_n]$ |

Thus, each network visibility appliance will include a network port corresponding to each other network visibility appliance of the multiple network visibility appliances. In some embodiments the network port is bidirectional (i.e., can transmit and receive data packets), while in other embodiments the network port is unidirectional (i.e., can only transmit or receive data packets). If the network port is unidirectional, each communication channel may correspond to a pair of network ports (e.g., an ingress port through which to receive data packets and an egress port through which to transmit data packets).

Each communication channel may be established via a tunnel between the corresponding network visibility appliances. As noted above, a "tunnel" is a mechanism that can be used to reliably transmit traffic across a network. Accordingly, traffic may be transmitted between pairs of network visibility appliances that each include a tunnel endpoint. To number of tunnels required to create a fully connected mesh between n network visibility appliances is given by:

$$C = \frac{n(n-1)}{2}.$$

Furthermore, each network visibility appliance included in the fully connected mesh will include n−1 tunnel endpoints (i.e., a tunnel endpoint for each remote instance of the deduplication program). While FIGS. 8A-B include 3 network visibility appliances, a visibility fabric could include any number of network visibility appliances. For example, a visibility fabric that includes 32 network visibility appliances (i.e., n=32) and has endpoint-to-network visibility appliance mapping ratios of 8:1-32:1 can readily support distributed deduplication across 256-1,024 different endpoints (e.g., virtual machines). Larger configurations (i.e., n>32) are also possible, though these situations may employ a multi-level hierarchy of network visibility appliances to cascade traffic across multiple hierarchical levels.

The controller can then program the separate load balancers to apply an identical transformation function to incoming data packets (step 1005). For example, each load balancer may be programmed to apply the same hash function. When a transformation function is agreed upon by all load balancers in a visibility fabric, each load balancer can independently route traffic based on values computed using the transformation function. For example, each load balancer may independently compute weights using the HRW hashing algorithm and then pick whichever destination node corresponds to the largest weight.

These steps may be performed in various sequences. For example, each load balancer could be programmed to apply an identical transformation function before being instantiated on a corresponding network visibility appliance. As another example, a separate instance of the deduplication program could be instantiated on each network visibility appliance before a separate load balancer is instantiated on each network visibility appliance.

Processing System

Figure 11:
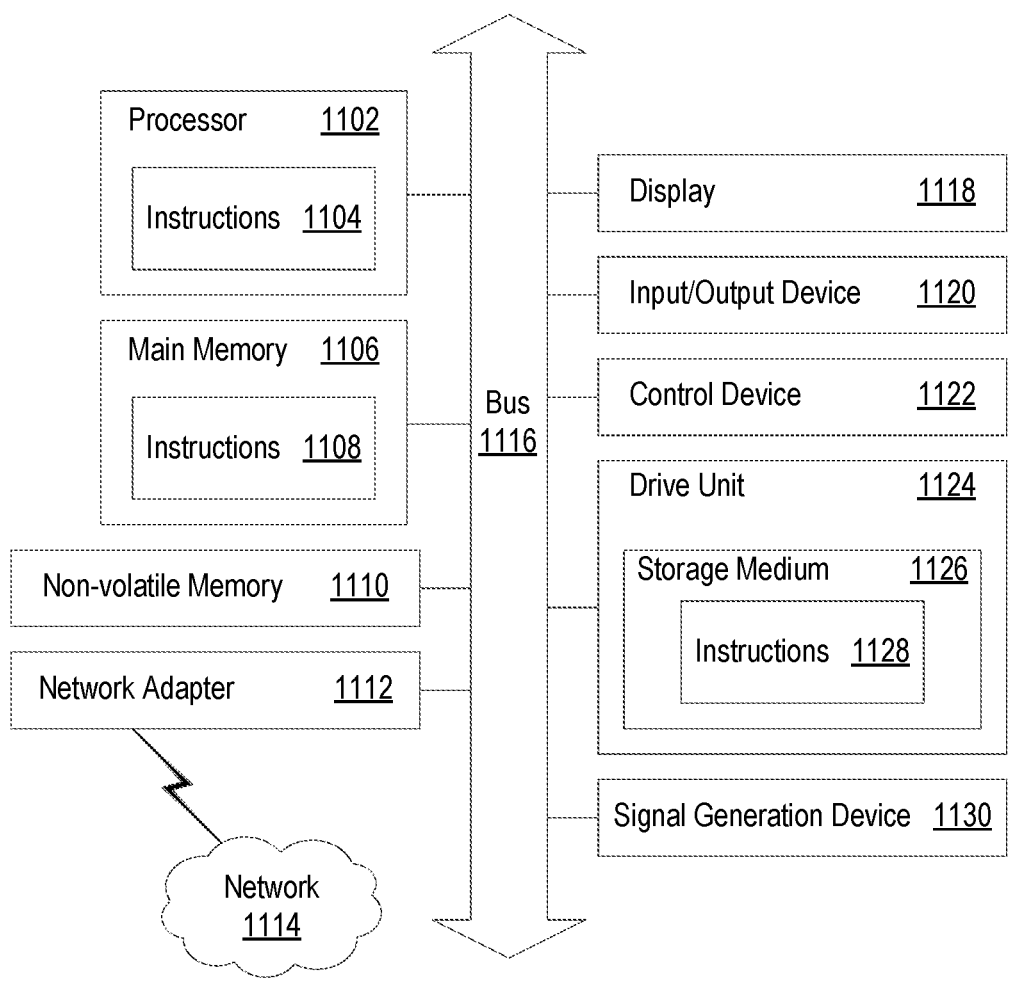
FIG. 11 includes a block diagram illustrating an example of a processing system in which at least some operations described herein can be implemented.

FIG. 11 includes a block diagram illustrating an example of a processing system 1100 in which at least some operations described herein can be implemented. For example, the processing system 1100 may be responsible for generating an interface through which an end user manages multiple network visibility appliances involved in a distributed deduplication scheme. As another example, at least a portion of the processing system 1100 may be included in a computing device (e.g., a server) that supports a network visibility appliance and/or a cloud computing platform. The process system 1100 may include one or more processors 1102, main memory 1106, non-volatile memory 1110, network adapter 1112 (e.g., network interfaces), display 1118, input/output devices 1120, control device 1122 (e.g., keyboard and pointing devices), drive unit 1124 including a storage medium 1126, and signal generation device 1130 that are communicatively connected to a bus 1116. The bus 1116 is illustrated as an abstraction that represents any one or more separate physical buses, point to point connections, or both connected by appropriate bridges, adapters, or controllers. The bus 1116, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 1100 operates as a standalone device, although the processing system 1100 may be connected (e.g., wired or wirelessly) to other devices. For example, the processing system 1100 may include a terminal that is coupled directly to a network appliance. As another example, the processing system 1100 may be wirelessly coupled to the network appliance.

In various embodiments, the processing system 1100 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 1100.

While the main memory 1106, non-volatile memory 1110, and storage medium 1126 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1128. The term "machine-readable medium" and "storage medium" shall also be taken to include any medium that is capable of storing, encoding, or carrying a set of instructions for execution by the processing system 1100 and that cause the processing system 1100 to perform any one or more of the methodologies of the presently disclosed embodiments.

In general, the routines that are executed to implement the technology may be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in a computer, and that, when read and executed by one or more processing units or processors 1102, cause the processing system 1100 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1110, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1112 enables the processing system 1100 to mediate data in a network 1114 with an entity that is external to the processing system 1100, such as a network appliance, through any known and/or convenient communications protocol supported by the processing system 1100 and the external entity. The network adapter 1112 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1112 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
   receiving virtualized traffic at a first ingress port of a first network visibility appliance;
   separating the virtualized traffic into
   a first batch of data packets that share a first characteristic in common, the first batch to be examined by a first instance of a deduplication program that executes in the first network visibility appliance, and
   a second batch of data packets that share a second characteristic in common, the second batch to be examined by a second instance of the deduplication program that executes in a second network visibility appliance,
   wherein the second network visibility appliance is configured to forward data packets that share the first characteristic in common to the first network visibility appliance for examination by the first instance of the deduplication program;

receiving a third batch of data packets at a second ingress port of the first network visibility appliance;
determining that all data packets in the third batch share the first characteristic in common;
forwarding all data packets of the first batch and all data packets of the third batch to the first instance of the deduplication program that executes in the first network visibility appliance for examination; and
forwarding all data packets of the second batch to an egress port for transmission to the second network visibility appliance for examination by the second instance of the deduplication program that executes in the second network visibility appliance.

2. The computer-implemented method of claim 1, wherein the virtualized traffic is associated with a first virtual machine, and wherein the third batch of data packets is included in virtualized traffic associated with a second virtual machine.

3. The computer-implemented method of claim 1, wherein said separating comprises:
generating a hash value for each data packet included in the virtualized traffic, thereby producing a plurality of hash values;
accessing a data structure that maps the plurality of hash values amongst a plurality of instances of the deduplication program,
wherein each hash value is mapped to only a single instance of the deduplication program, and
wherein each instance of the deduplication program executes in a different network visibility appliance;
determining that each data packet in the first batch of data packets corresponds to an entry in the data structure that specifies the first instance of the deduplication program; and
determining that each data packet in the second batch of data packets corresponds to an entry in the data structure that specifies the second instance of the deduplication program.

4. The computer-implemented method of claim 3, further comprising:
receiving an indication that the second network visibility appliance is not presently accessible; and
modifying entries in the data structure that correspond to the second batch of data packets to indicate a third instance of the deduplication program,
wherein the third instance of the deduplication program resides on a third network visibility appliance, and
wherein said modifying causes the second batch of data packets to be forwarded to a second egress port for transmission to the third network visibility appliance.

5. The computer-implemented method of claim 1, wherein the virtualized traffic is associated with a plurality of virtual machines.

6. A network visibility appliance comprising: a first ingress port through which to receive virtualized traffic associated with a virtual machine; a second ingress port; an egress port through which data packets are routed away from the network visibility appliance; and a processor configured to receive the virtualized traffic at the first ingress port; separate the virtualized traffic into a first batch of data packets that share a first characteristic in common, the first batch to be examined by a first instance of a deduplication program that executes in the network visibility appliance, and a second batch of data packets that share a second characteristic in common, the second batch to be examined by a second instance of the deduplication program that executes in another network visibility appliance, wherein the other network visibility appliance is configured to forward data packets that share the first characteristic in common to the network visibility appliance for examination by the first instance of the deduplication program; receive a third batch of data packets at the second ingress port of the network visibility appliance; Supplemental Response to Office Action of Sep. 8, 2021 determine that all data packets in the third batch share the first characteristic in common; forward all data packets of the first batch and all data packets of the third batch to the first instance of the deduplication program that executes in the network visibility appliance for examination; forward all data packets of the second batch to the egress port for transmission to the other network visibility appliance for examination by the second instance of the deduplication program that executes in the other network visibility appliance.

7. The network visibility appliance of claim 6, further comprising: Supplemental Response to Office Action of Sep. 8, 2021 a tool port through which to route at least some of the virtualized traffic to a network tool.

8. The network visibility appliance of claim 7, wherein the processor is further configured to: monitor whether a data packet is filtered by the first instance of the deduplication program; and responsive to a determination that the data packet was not filtered by the first instance of the deduplication program, forward the data packet to the tool port for transmission to the network tool.

9. The network visibility appliance of claim 7, wherein the tool port corresponds to one end of a tunnel connected between the network visibility appliance and the network tool.

10. The network visibility appliance of claim 6, wherein of the first and second instances of the deduplication program executes in a different network visibility appliance within a visibility fabric.

11. The network visibility appliance of claim 6, wherein the first ingress port corresponds to one end of a first tunnel connected between the network visibility appliance and the virtual machine, and wherein the egress port corresponds to one end of a second tunnel connected between the network visibility appliance and the other network visibility appliance.

12. A non-transitory computer-readable storage medium storing instructions, execution of which by a processor causes operations comprising:
receiving virtualized traffic at a first ingress port of a first network visibility appliance;
separating the virtualized traffic into
a first batch of data packets that share a first characteristic in common, the first batch to be examined by a first instance of a deduplication program that executes in the first network visibility appliance, and
a second batch of data packets that share a second characteristic in common, the second batch to be examined by a second instance of the deduplication program that executes in a second network visibility appliance,
wherein the second network visibility appliance is configured to forward data packets that share the first characteristic in common to the first network visibility appliance for examination by the first instance of the deduplication program;
receiving a third batch of data packets at a second ingress port of the first network visibility appliance;
determining that all data packets in the third batch share the first characteristic in common;

forwarding all data packets of the first batch and all data packets of the third batch to the first instance of the deduplication program that executes in the first network visibility appliance for examination; and forwarding all data packets of the second batch to an egress port for transmission to the second network visibility appliance for examination by the second instance of the deduplication program that executes in the second network visibility appliance.

13. The non-transitory computer-readable storage medium of claim 12, wherein the operations further comprise:

forwarding at least a portion of the first batch of data packets to a tool port for transmission to a network tool.

14. The non-transitory computer-readable storage medium of claim 13, wherein the operations further comprise:

receiving the portion of the first batch of data packets from the network tool; and forwarding, the portion of the first batch of data packets to a network node.

15. The non-transitory computer-readable storage medium of claim 12, wherein said separating the virtualized traffic includes:

applying a specified transformation function to generate a value for each of a plurality of data packets received at the first ingress port to produce a plurality of values.

16. The non-transitory computer-readable storage medium of claim 15, wherein the specified transformation function is applied by a load balancer executing at the network appliance, wherein the virtualized traffic received at the first ingress port of the network appliance is routed to the load balancer, and wherein the third batch of data packets received at the second ingress port is routed to the first instance of the deduplication program from the second ingress port without being routed to the load balancer.

17. The non-transitory computer-readable storage medium of claim 15, wherein each value is based on at least one of: Transmission Control Protocol (TCP) sequence number, header length, payload length, type of service, protocol, source address, or destination address.

18. The non-transitory computer-readable storage medium of claim 12, wherein said separating the virtualized traffic includes:

accessing a data structure that maps a plurality of values amongst a plurality of instances of the deduplication program, wherein each value is mapped to only a single instance of the deduplication program, and wherein each instance of the deduplication program executes in a different network appliance;

determining that each data packet in the first batch of data packets corresponds to an entry that specifies the first instance of the deduplication program; and determining that each data packet in the second batch of data packets corresponds to an entry that specifies the second instance of the deduplication program.

* * * * *

UNITED STATES PATENT AND TRADEMARK OFFICE
CERTIFICATE OF CORRECTION

PATENT NO. : 11,405,289 B2
APPLICATION NO. : 16/001721
DATED : August 2, 2022
INVENTOR(S) : Anil Rao Page 1 of 1

It is certified that error appears in the above-identified patent and that said Letters Patent is hereby corrected as shown below:

In the Claims

In Column 20, Lines 7-8, delete "Supplemental Response to Office Action of Sep. 8, 2021".

In Column 20, Lines 19-20, delete "Supplemental Response to Office Action of Sep. 8, 2021".

Signed and Sealed this
Seventeenth Day of June, 2025

Coke Morgan Stewart
*Acting Director of the United States Patent and Trademark Office*